March 22, 1960 W. K. HODDER 2,929,928

SIGNAL CONVERSION SYSTEM

Filed July 1, 1955

INVENTOR
WAYNE K. HODDER,
BY
Henry Heyman
ATTORNEY.

United States Patent Office 2,929,928
Patented Mar. 22, 1960

2,929,928

SIGNAL CONVERSION SYSTEM

Wayne K. Hodder, Los Angeles, Calif., assignor to Hughes Aircraft Company, Culver City, Calif., a corporation of Delaware Application July 1, 1955, Serial No. 519,307

5 Claims. (Cl. 250—27)

Figure 1:
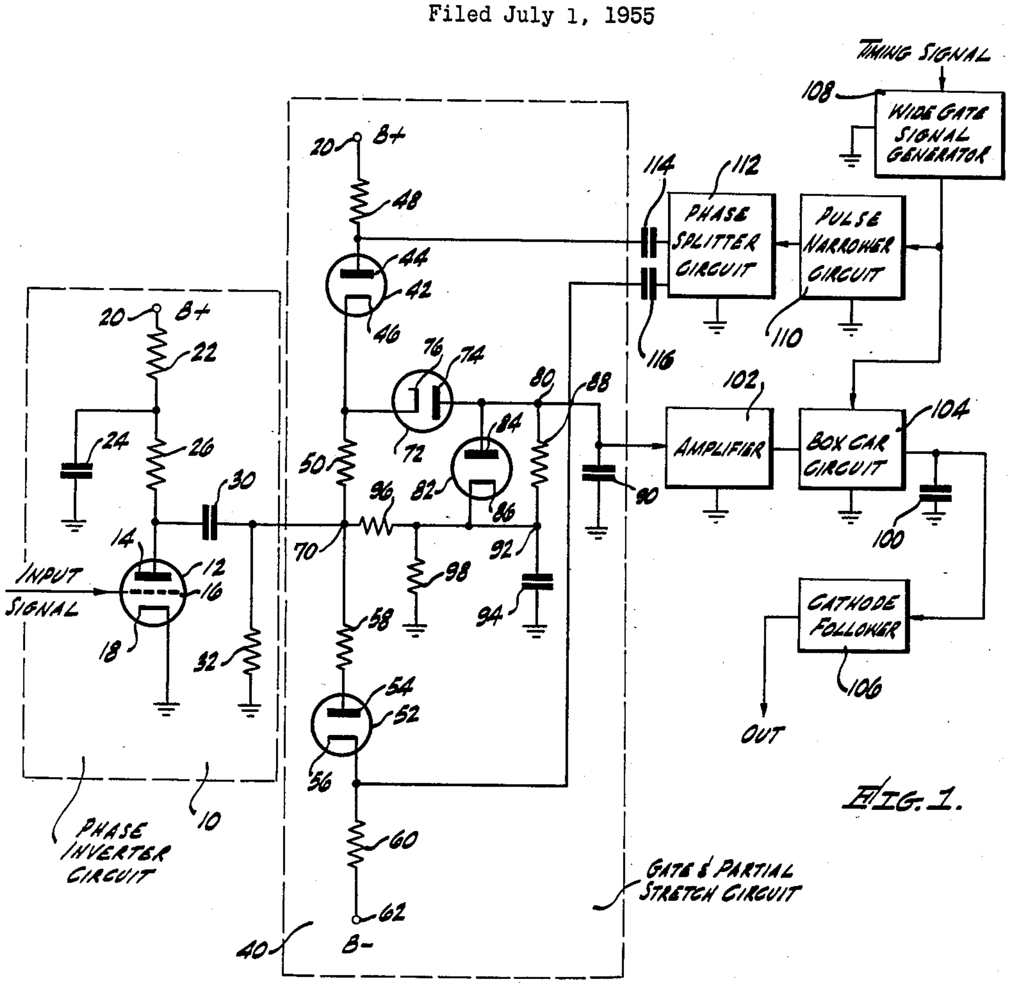

This invention relates to signal conversion systems, and particularly to systems for providing a voltage envelope from a series of pulses, the voltage envelope being proportional in amplitude to the successive individual pulses, and substantially constant between pulses.

Signal conversion circuits which extend the duration of a signal are widely employed in communication and location systems. Such circuits are sometimes referred to as box car circuits or pulse stretchers. In one common form they are employed to stretch one pulse of a series of pulses until the occurence of the next succeeding pulse, thus defining an output wave or envelope by the individual pulses.

The systems of the prior art employed for such pulse stretching purposes have often required considerable current, and in addition have been subject to excessive current leakage. The current levels which are used, and the values of the components which are consequently employed, reduce the accuracy and reliability with which the system can produce the desired envelope. Further, it is often difficult to provide accurate stretching over a considerable period between pulses without the employment of complex circuitry. The devices previously known have been especially subject to leakage and instability when the stretching is required to be of considerable duration.

Accordingly, it is the object of this invention to provide an improved device, more accurate and reliable than those heretofore known, to convert a series of pulses into an output wave the amplitude of which is determined by the pulses and which is substantially constant between pulses.

It is another object of this invention to provide an improved circuit for stretching input pulses, which circuit utilizes little current to provide an output voltage proportional to the input pulse and substantially constant for a predetermined duration.

Another object of this invention is to provide an improved circuit having little current demand for stretching an input pulse into a pulse of greater duration but having substantially constant amplitude.

A signal conversion system in accordance with the invention may convert a series of pulses into an output voltage envelope by successively increasing the duration of the input pulses. A timing pulse concurrent with each input pulse may be used to generate a relatively wide gate pulse. A narrow gate pulse generated from each wide gate pulse may be employed to sample the amplitude of the associated input pulse. The amplitude of the input pulse then determines the extent of charge provided to a first storage capacitor through a stabilized gating and partial stretching circuit. A separate gating circuit, operating during the entire duration of the wide gate pulse, charges a second storage capacitor to a voltage level determined by the charge on the first storage capacitor. The voltage level of the second storage capacitor is the output voltage level of the system, and is substantially constant until application of the next input pulse of the series.

Figure 2:
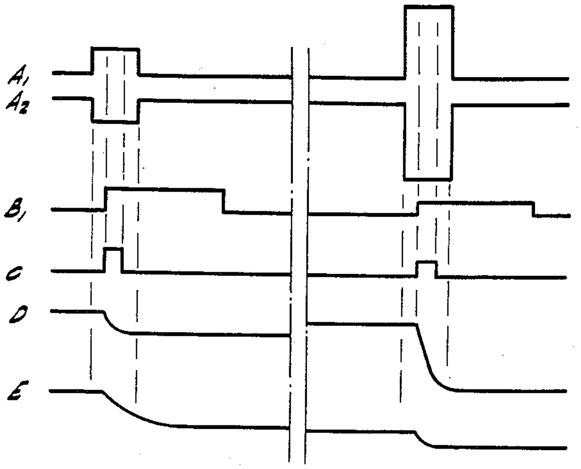

The novel features of the invention, as well as the invention itself, both as to its organization and method of operation, will best be understood from the following description, when taken with the accompanying drawing, in which like reference numerals refer to like parts, and in which:

Fig. 1 is a diagram, partly in schematic and partly in block diagram form, of one arrangement which may be employed in practicing the invention, and Fig. 2, comprising waveforms A to E, is an idealized representation of waveforms occurring at selected points in the arrangement of Fig. 1.

A signal conversion system in accordance with the invention, referring now to Fig. 1, may employ input signals occurring as a series of pulses from an external source (not shown), and provide an output envelope of the desired continuous form. For purposes of illustration, the input signals are assumed to be of positive polarity, of relatively rectangular shape, and of variable amplitude. In accordance with well known techniques, however, signals of negative polarity or of both polarities may be converted to input signals of the desired form. Detailed explanations of such alternative techniques are not included here to simplify the present description.

The input signals in the present example are applied to a phase inverter circuit 10 including an amplifier triode 12 arranged as a video amplifier. The plate 14 of the amplifier triode 12 is coupled to a source of positive potential, here denoted as a B+ supply 20, through a series pair of plate load resistors 22, 26. The junction point between the plate load resistors 22, 26 is coupled to a common conductor, here designated by the conventional ground symbol, through a capacitor 24. The control grid 16 of the amplifier triode 12 is responsive to the input signals, and the amplifier triode cathode 18 is coupled to ground.

Outputs from the video amplifier arrangement of the phase inverter circuit 10 are taken from the plate 14 of the amplifier triode 12 through a differentiating circuit comprising a capacitor 30 connected to the plate 14 from one terminal and coupled through a resistor 32 to ground from its second terminal.

The differentiating circuit is coupled from the second terminal of the capacitor 30 to a gate and partial stretch circuit 40 having important functions in the system. The gate and partial stretch circuit 40 includes a pair of series connected unidirectionally conducting elements, here shown as first and second gating diodes 42, 52 respectively. The plate 44 of the first gating diode 42 is coupled to the B+ supply 20 through a load resistor 48. The cathode 46 of the first gating diode 42 is coupled through a pair of series connected resistors 50, 58 to the plate 54 of the second gating diode 52. The cathode 56 of the second gating diode 52 is coupled through a resistor 60 to a source of negative potential or B— supply 62.

The junction point between the resistors 50, 58 coupling the first and second gating diodes 42, 52 respectively, is hereafter termed the first junction point 70. The first junction point 70 is provided with the input signals for the gate and partial stretch circuit 40 from the differentiating circuit of the phase inverter circuit 10.

A third gating diode 72 couples the cathode 46 of the first gating diode 42 to a second junction point 80, the voltage level of which provides an output of the gate and partial stretch circuit 40. The plate 74 of the third gating diode 72 is coupled to the second junction point 80 and its cathode 76 is coupled to the cathode 46 of the first gating diode 42.

A first storage capacitor 90 has one terminal connected directly to the second junction point 80, and its other terminal connected to ground. A clamping diode 82 is connected in parallel with a discharge resistor 88 connected to the second junction point 80. The plate 84 of the clamping diode 82 is connected directly to the second junction point 80.

The voltage level at the terminal of the discharge resistor 88 which is opposite the second junction point 80 is also useful in describing the operation of the system. This terminal of the discharge resistor 88 is hereafter referred to as the third junction 92, and is coupled through a bypass capacitor 94 to ground. The first junction point 70 is coupled to the third junction 92 through a resistor 96. The last mentioned resistor 96 forms a divider network with another resistor 98 which couples the third junction to ground. The discharge resistor 88, bypass capacitor 94, and divider network resistors 98, 96 form an R-C circuit which maintains a predetermined voltage level relationship between the first and second junction points 70, 80, in the quiescent condition of the system.

The first storage capacitor 90 is coupled to a second storage capacitor 100 through an amplifier circuit 102 and a gating circuit hereafter referred to as a box car circuit 104. The amplifier 102 preferably provides a controlled output proportional to the voltage level on the first storage capacitor 90, for which purpose a feedback amplifier circuit may be employed. The box car circuit 104 provides an output determined by the input signal applied to it, during a period of time controlled by applied gating signals. Box car circuits are widely employed in pulse systems, and an arrangement suitable for the box car circuit 104 employed here is shown and described in section 10.3, Figure 10.12, volume 19 of the MIT Radiation Laboratory Series, published by the McGraw-Hill Book Company (1949). Note that if such a circuit is employed, the output resistor there shown is to be replaced by the second storage capacitor 100 of the present system. For the present system, output signals may be derived from the second storage capacitor 100 through a cathode follower circuit 106.

Gating signals for the system are derived, in response to timing signals, from a circuit here termed the wide gate signal generator 108. If the present system is employed in a tracking arrangement, the timing signal may represent a range gate signal derived in automatically tracking the same target. In systems which do not employ or require a range gate function, the system may be self-timing, and the input signal itself may be employed to generate the timing signal. The timing signal indicates the presence of the input signal and is used in controlling the gating function. A circuit which may be employed for the wide gate signal generator 108 is shown and described in a copending application for patent entitled "Wide Pulse Blocking Oscillator," filed by Wayne K. Hodder on March 25, 1954, Serial Number 418,630, now abandoned, and assigned to the assignee of the present invention. As described in the copending application referred to, the wide gate signal generator 108 provides a pulse of controlled duration and polarity to the box car circuit 104.

One of the outputs of the wide gate signal generator 108 is applied through a pulse narrower circuit 110 to a phase splitter circuit 112. The pulse narrower circuit 110 forms a relatively narrow gate pulse from the output of the wide gate signal generator 108. A delay circuit as described in section 6.14, Figure 6.25*b* in volume 19 of the MIT Radiation Laboratory Series may be employed for the pulse narrower circuit 110. The phase splitter 112 provides, in well known fashion, coincident signals of opposite polarity in response to inputs derived from the pulse narrower circuit 110. One output of the phase splitter circuit 112 is coupled through a coupling capacitor 114 to the plate 44 of the first gating diode 42. The other output of the phase splitter circuit 112 is coupled through a coupling capacitor 116 to the cathode 56 of the second gating diode 52.

In operation, referring now to Fig. 1, input signals are applied to the grid 16 of the amplifier triode 12 and the phase inverter circuit 10 and timing signals are applied to the wide gate signal generator 108. As stated above, a timing signal concurrent with each desired input signal is provided from associated circuitry or by self-timing, as desired. Note that adjustment of the time relationship of the two signals may be made if needed, by the inclusion of appropriate delays. For illustration here, the input signals are assumed to be provided as a series of individual pulses, each of substantially rectangular waveform and each being variable in amplitude with respect to the others. It is desired to provide from these input signals an output envelope having amplitudes proportional to the individual pulses at corresponding times, and substantially constant between input pulses.

The video amplifier arrangement of the phase inverter circuit 10 provides an inverted wave shape in response to an input signal. The input pulses applied to the amplifier triode 12 may be, for example, like the pulses shown in idealized form as waveform $A_1$ in Fig. 2.

The differentiating capacitor 30 and resistor 32 coupled to the plate 14 of the triode 12 form a passive network with the capacitor 24 and plate load resistor 26 also coupled to the plate 14. The passive network as a whole coacts with the differentiating effect of capacitor 30 and the associated resistors 32, 50, 58, 96, to preserve the rectangular waveform. In response to waveform $A_1$ in Fig. 2, therefore, a waveform similar to that at $A_2$ in Fig. 2 may be provided at the first junction point 70 in the gate and partial stretch circuit 40.

The gate and partial stretch circuit 40 provides a selective transfer of signals to the succeeding portions of the system. It will be convenient, however, first to describe the provision of other signals from the timing signal in the system. On application of a timing signal, concurrent with an input signal, to the wide gate signal generator 108, the wide gate signal generator 108 provides a positive, coincident, pulse of relatively long duration at its output. These signals may have the shape shown as waveform B in Fig. 2. The output of the wide gate signal generator 108 is hereafter referred to as the wide gate signal. One of the wide gate signals is applied from the wide gate signal generator 108 to the pulse narrower circuit 110, which provides a brief output only during a portion of the wide gate signal. This signal, hereafter called the narrow gate, occurs in a central time portion of the input signal, and provides a strobing or clocking pulse for sampling the associated input signal. The narrow gate signals may have the shapes represented at C in Fig. 2, with the relationship shown to the input pulse $A_1$.

The narrow gate signal is applied to the phase splitter circuit 112, which splits the narrow gate into coincident positive and negative pulses, and applies these pulses through the associated coupling capacitors 114, 116 to the gate and partial stretch circuit 40. The wide gate signal is also applied to the box car circuit 104, to control passage of signals through the box car circuit 104.

In a quiescent condition, without external signals applied to the system, the voltage levels of the first junction point 70, the second junction 80, and the third junction 92 are all substantially the same. Current flows from the B+ supply 20 through the first gating diode 42, the first junction 70, and the second gating diode 52 to the B− supply 62. A potential difference between the second junction 80 or the third junction 92 and the first junction 70 causes current to flow until stability is achieved. A change in the potential of the first junction point 70, for example, causes current flow through one voltage divider network resistor 96 to make compensatory changes in the potentials of the third junction point 92 and the second junction point 80. The degree of compensation is controlled by the value of the other voltage divider network resistor 98.

The application of an input signal alone, or a timing signal alone, does not affect the output provided from the system. Thus random pulses do not alter the operation with respect to the signals with which the system is dealing. An input signal applied alone to the phase inverter circuit 10 lowers the potential of the plate 14 of the amplifier triode 12, and through the differentiating circuit 30, 32 lowers the potential of the first junction point 70. The drop in potential of the first junction point 70 does not, however, produce a corresponding effect at the second junction point 80. In the quiescent condition the potential at the cathodes 46, 76 of the first and third gating diodes 42, 72, respectively, is greater by some selected amount than the potential of the first junction point 70. The amount of this potential difference is controlled largely by the value of the intermediate resistor 50, which may be selected for input pulses less than any given maximum. Note that the full value of a drop at the first junction point 70 is not provided at the cathode 76 because of the loss through the resistor 50. Thus in the quiescent condition the cathode 76 of the third gating diode 72 is at a higher potential than the plate 74, and the third gating diode 72 is biased to nonconduction. With an input pulse, the drop in the potential derived at the cathode 76 of the third gating diode 72 from the first junction point 70 through the resistor 50 is not sufficient to make the third gating diode 72 conduct. Therefore, there is substantially no change in the potential level of the second junction point 80 and no change in the output provided from the system.

A timing signal alone likewise provides no change in the system output. The gate signal derived from the timing signal acts under these conditions to cut off both the first and second gating diodes 42, 52. More specifically, the negative signal applied to the plate 44 of the first gating diode 42 and the positive signal applied to the cathode 56 of the second gating diode 52 from the phase splitter circuit 112 bias both those diodes 42, 52 to the nonconductive state. The voltages acting on the first junction point 70 collapse, and the potential of the cathode 76 of the third gating diode 72 drops toward the level of the first junction point 70. The cathode 76 does not drop below the first or second junction points 70, 80, however, so that again the second junction point 80 and the output are unaffected.

On the concurrence of an input signal and a timing signal, however, the first storage capacitor 90 of the gate and partial stretch circuit 40 is charged to an extent proportional to the amplitude of the input signal. The outputs of the phase splitter circuit 112 provided in response to the timing signal cut off the first and second gating diodes 42, 52, respectively. The narrow gate signal may be of a duration, by way of illustration, of 0.2 microsecond, and occur in the central time portion of an input signal which may be of some 0.5 to 1.0 microsecond duration. As described previously, nonconduction of the first and second gating diodes 42, 52 allows the potential of the cathode 76 of the third gating diode 72 to assume the level of the first junction point 70. Because of the concurrent input pulse, which should be at its peak during the narrow gate signal, the first junction point 70 drops in potential below its quiescent condition an amount determined by the amplitude of the input pulse. The drop is transmitted through the resistor 50 and the third gating diode 72, to lower the potential of the second junction point 80 an amount proportional to the input pulse. Note that the polarity of the third gating diode 72 acts to block positive pulses and to pass only negative pulses from the first junction 70 to the second junction 80.

During the period of the narrow gate, therefore, the first storage capacitor 90 is charged negatively to an amplitude which is proportional to the amplitude of the input pulse. On termination of the narrow gate, the first storage capacitor 90 ceases to charge and begins to discharge at a rate determined by the time constant of the discharge resistor 88 and the first storage capacitor 90. This discharge is preferably so maintained, in the present example, that for the first three to five microseconds after the narrow gate pulse the voltage level of the first storage capacitor 90 is substantially constant. An idealized waveform which represents changes in the voltage levels at the first storage capacitor is shown at D in Fig. 2.

The voltage level applied in charging the first storage capacitor 90 is used to provide a partially stretched output through the coupled amplifier 102 and box car circuit 104. The box car circuit 104 is "open" (to gate through a pulse) during the period of the wide gate pulses from the wide gate signal genertaor 108. The wide gate signal may be of four to five microseconds duration. The voltage level of the first storage capacitor 90 is during this "open" period passed through the amplifier 102 and the box car circuit 104 to charge the second storage capacitor 100. As a consequence, the second storage capacitor 100 is charged, during the wide gate pulse, to a voltage level proportional to the amplitude of the last previous input pulse. The value of the second storage capacitor 100 may, as is well known, be such as to accept and maintain this charge at a substantially constant level for the period between pulses (say 500 microseconds). The potential of the second storage capacitor may, as shown, drive a cathode follower 106 to provide a system output for any desired purpose. In the present example it is desired that the output signals be inverted with respect to the input signals, although still proportional. Inversion of the output may of course be employed if desired. Typical voltage variations at the second storage capacitor 100 for the signals assumed may be as shown at E in Fig. 2.

Various useful features have been included in the gate and partial stretch circuit 40 to increase the stability and reliability of the system. A clamping diode 82 may be employed to stabilize the potentials of the junction points 70, 80 and 92 during rest or quiescent conditons. If the amplifier 102, for example, leaks positive current during this rest condition, the clamping diode 82 will act to preserve the relationship desired between the potentials of the various junctions 70, 80 and 92.

The divider network 96, 98 and the bypass capacitor 94 may be employed to maintain equal quiescent potentials at the first and second junction points 70 and 80 even though actual potentials would tend to change due to tolerances in the resistors 48, 50, 58, 60 and the B+ and B— supplies 20, 62, respectively.

With the arrangement provided, the first storage capacitor 90 will properly receive a charge proportional to the input signal, although the time constant of the circuit composed of the resistor 50, third gating diode 72, and the first storage capacitor 90 may be varied. If the time constant is long, the first storage capacitor 90 will not be charged to full amplitude, but will be cut off on termination of the narrow gate at a level proportional to the amplitude of the input signal. If the time constant is short, on the other hand, the first storage capacitor 90 will be charged to a full value, again proportional to the input pulse. Either technique may be employed, as desired.

Thus there has been described an improved circuit for converting signals from a series of input pulses to a voltage envelope which is determined by the individual pulses, and which is substantially constant between pulses. The system operates rapidly, and stably and reliably increases the duration of input pulses.

What is claimed is:

1. A circuit for stretching the time duration of an input pulse under control of a gating signal comprising phase splitter means responsive to said gating signal, a first electrical circuit junction, means responsive to said input pulse for providing said input pulse in a predetermined polarity to said first circuit junction, a pair of unidirectional gating means and an intermediate pair of resistive elements having a midpoint and coupled in series, with the midpoint being coupled to said first circuit junction and each of said unidirectional gating means responsive to a different signal from said phase splitter means for providing an output proportional to said input pulse only on the concurrence of a gating signal and an input pulse, a storage capacitor coupled to said gating means and responsive to outputs of said gating means and means coupled to said first circuit junction and to said storage capacitor for maintaining a predetermined quiescent condition voltage level relationship between said first junction and said capacitor.

2. A circuit for stretching the time duration of an input pulse under control of a gating signal, said circuit comprising phase splitter means responsive to said gating signal, a first circuit junction, means responsive to said input pulse for providing said input pulse in a predetermined polarity to said first circuit junction, a pair of series-connected, unidirectionally-conducting elements coupled together and to said first circuit junction, said pair of unidirectionally-conducting elements being responsive to said phase splitter means and conducting current except on the provision of signals from said phase splitter means, a second circuit junction, means including diode gating means coupling said first and second circuit junctions, and a resistor and a capacitor coupled to said second circuit junction, said capacitor being charged through said diode gating means during periods of non-conduction in said unidirectionally-conducting elements, and discharging through said resistor during periods of conduction in said elements.

3. A circuit for stretching the time duration of an input pulse comprising: means providing a gating signal concurrent with a central portion of the input pulse; signal phase splitter means responsive to the gating signal and providing concurrent gate signals of opposite polarity; amplifying means responsive to the input pulse for providing a pulse of negative polarity; a first electrical circuit junction; a differentiating circuit coupling said amplifying means to said first circuit junction and applying the negative pulses from said amplifying means to said first circuit junction; a first, normally conducting, gating diode, the plate of which is coupled to said phase splitter means and responsive to negative gate signals therefrom; a first resistor coupling the cathode of said first gating diode to said first circuit junction; a second, normally conducting, gating diode, the plate of which is coupled to said first circuit junction and the cathode of which is coupled to said phase splitter means and responsive to positive gate signals therefrom; a second electrical circuit junction; means including a voltage divider network, a clamping diode, and a by-pass capacitor coupling said first and second circuit junctions for maintaining a predetermined quiescent condition voltage level relationship between said first and second circuit junctions; a third gating diode connecting said first resistor and the cathode of said first gating diode to said second circuit junction, said third gating diode being arranged in a polarity to block positive voltage levels at the cathode of said first gating diode from said second circuit junction; and a storage capacitor responsive to the voltage level of said second circuit junction for providing a signal of increased duration over the input pulse.

4. A circuit for providing an output voltage envelope proportional at successive points in time to the peak voltage of individual input pulses of a series of positive pulses, the output voltage being substantially constant for the period between successive pulses, said circuit comprising phase inverter means responsive to said positive input pulses for providing negative signals, a differentiating circuit including a first junction point and responsive to negative pulses from said phase inverter, a gate circuit responsive to said input pulses and providing wide gate signals of a predetermined duration, means responsive to said gate signals for providing narrowed gate signals, phase splitter means responsive to said narrowed gate signals for providing concurrent pulses of opposite polarity, a pair of normally conducting gating diodes, a resistor coupling the cathode of a first of said gating diodes to said first junction point, circuit means coupling said phase splitter means to the plate of the first gating diode to apply negative pulses thereto to cut off said first gating diode, circuit means coupling said phase splitter means to the second of said gating diodes to apply positive pulses thereto to cut off said second gating diode, an R-C circuit including a second junction point, a third gating diode coupling said resistor and the cathode of said first gating diode to said second junction point, a first storage capacitor coupled to said second junction point, a box car circuit responsive to the potential level of said first storage capacitor and coupled to said wide gate signal generator, and a second storage capacitor, the voltage level of one terminal of which provides the output voltage level of the circuit.

5. A signal conversion circuit for providing an output signal proportional to and of greater duration than an input signal of predetermined duration, said circuit comprising: means providing sampling signals during and less than the duration of said input signal; unidirectional gating means, including a pair of series-connected diodes having an intermediate circuit junction, responsive at said intermediate circuit junction to said input and sampling signals for providing an output proportional to said input pulse and of the duration of said sampling pulses; a storage capacitor responsive to the output of said unidirectional gating means; and means including a clamping diode and a gating diode coupled to one of said pair of diodes, said circuit junction and said storage capacitor for maintaining a predetermined quiescent condition voltage level relationship between said circuit junction and said storage capacitor.

References Cited in the file of this patent

UNITED STATES PATENTS

| | | |
|---|---|---|
| 2,564,017 | Maggio | Aug. 14, 1951 |
| 2,630,486 | Rieke | Mar. 3, 1953 |
| 2,683,803 | Keizer | July 13, 1954 |
| 2,697,782 | Lawson | Dec. 21, 1954 |
| 2,716,324 | Lester et al. | Aug. 23, 1955 |
| 2,812,435 | Lyon | Nov. 5, 1957 |
| 2,841,707 | McCulley | July 1, 1958 |

OTHER REFERENCES

Chance et al.: Waveforms (M.I.T. Radiation Lab. Series, vol 19) 1949, pages 47–49 (sec. 3.6) and pages 370–375 (sec. 10.3).